UNITED STATES PATENT OFFICE.

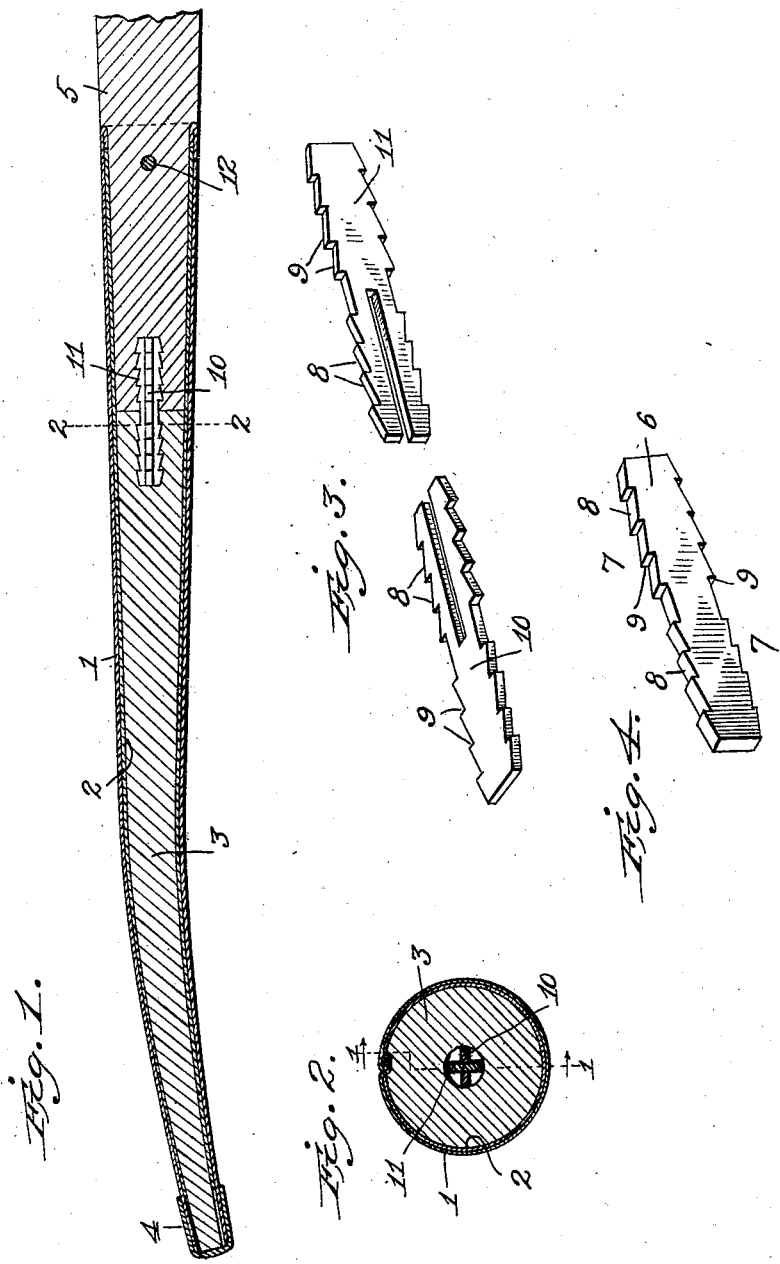

CHARLES E. TITCHENER, OF BINGHAMTON, NEW YORK.

SHAFT END.

No. 877,969.	Specification of Letters Patent.	Patented Feb. 4, 1908.

Application filed June 5, 1907. Serial No. 377,424.

*To all whom it may concern:*

Be it known that I, CHARLES E. TITCHENER, a citizen of the United States, residing at Binghamton, in the county of Broome and State of New York, have invented new and useful Improvements in Shaft-Ends, of which the following is a specification.

This invention relates to horse-drawn vehicles, and its object is to provide improved means for attaching to broken shafts the metal, wood-filled shaft-ends ordinarily used to piece out such shafts.

It has been proposed to form tapering socket-and-tenon joints between the shaft and the filler; and also to make a scarf joint; but these require considerable skill to construct them properly. By my invention the work can be done by unskilled labor and in a short time.

I provide the metal sheath with the usual wooden filler, and form the latter with its butt end squared off and drilled centrally with a dowel hole. The end of the broken shaft is to be similarly squared off and bored centrally. A dowel of improved construction is driven into the end of the shaft, and the shaft-end is then forced on, the projecting end of the dowel entering the hole in the filler. The usual rivet put through the end of the metal sheath into the shaft completes the job.

In the accompanying drawing, Figure 1 is a longitudinal section on the line 1—1, Fig. 2, of a portion of a shaft and a shaft-end united thereto by means of my improved dowel pin. Fig. 2 is a cross section on the line 2—2, Fig. 1. Fig. 3 is a perspective view of the two parts of the pin separated, and Fig. 4 shows a modified structure of pin.

The shaft-end comprises the metal sheath 1, having a sheet metal lining 2, and containing the wooden filler 3, which terminates well within the butt end of the sheath. A thimble 4 closes the tip of the shaft-end. The butt end of the filler is squared off to fit against the squared end of the shaft 5. A hole is drilled centrally in the butt end of the filler and also in the end of the shaft, so that the two holes will be in alinement when the parts are assembled. These holes are for the purpose of receiving a dowel pin which strengthens the joint and secures together the shaft and the shaft-end.

My improved dowel pin is composed of one or more bars of metal somewhat wider than the diameter of the holes in the shaft and filler, and having teeth formed in one or both edges. If a single bar 6 is used, like that shown in Fig. 4, it is made of heavy stock to give it stiffness and may be of any desired shape in cross section. The teeth 7 are arranged to face from each end of the bar towards its middle, their inclined tops 8 offering but little resistance when the pin is driven into the holes in the filler and shaft, while their upright or transverse faces 9 will engage with the fibers of the wood and resist any tendency to pull the pin out. The pin will thus be securely held in both the shaft and the filler. If desired, the pin may be composed of more than one bar; such for instance as the two serrated bars 10 and 11 shown in Figs. 1, 2 and 3. These bars are duplicates, and are slotted from one end to the middle, so that they can be put together in the form of a four-ribbed structure, cruciform in cross section. This form of pin gives double the number of holding surfaces as compared with the single bar shown in Fig. 4, and can be made of lighter stock.

In putting on this shaft-end, the serrated pin is driven into the end of the shaft 5, for half its length, and the shaft-end is then forced on over the shaft, the projecting end of the pin entering the hole in the filler. When the filler has abutted snugly against the end of the shaft, a rivet 12 is inserted through the sheath and into the shaft. It will be seen that the operation of putting on this shaft-end is very simple, and can be performed by unskilled labor and in a short time. My improved serrated dowel pin holds the parts together securely and makes the joint stiff and strong.

Having thus described my invention what I claim is:—

The combination with a shaft, and a shaft-end having a wooden filler meeting the end of said shaft in a square butt joint, of a dowel pin uniting said shaft and filler, said pin being composed of two serrated bars slotted from one end and assembled in a cruciform structure.

In testimony whereof I have signed my name to this specification in the presence of two subscribing witnesses.

CHARLES E. TITCHENER.

Witnesses:
 B. M. STANNARD,
 G. E. STURDEVANT.